United States Patent [19]

Aoki et al.

[11] 4,300,826
[45] Nov. 17, 1981

[54] FOCUS INDICATING DEVICE FOR CAMERA

[75] Inventors: Harumi Aoki, Kiyose; Katsuhiko Miyata, Ageo; Koji Suzuki, Asaka, all of Japan

[73] Assignee: Asahi Kogaku Kogyo Kabushiki Kaisha, Tokyo, Japan

[21] Appl. No.: 123,313

[22] Filed: Feb. 21, 1980

[30] Foreign Application Priority Data

Mar. 7, 1979 [JP] Japan .................................. 54-26500

[51] Int. Cl.³ ............................................. G03B 13/18
[52] U.S. Cl. ................................ 354/60 L; 354/198;
354/199; 354/289; 354/53; 355/61
[58] Field of Search ................ 354/25, 31, 53, 39,
354/289, 57, 60 L, 72, 155, 195, 198, 199;
350/46; 352/140, 171; 355/59, 61

[56] References Cited

U.S. PATENT DOCUMENTS 4,047,022  9/1977  Holle ..................................... 354/25
4,089,012  5/1978  Kawasaki .............................. 354/53
4,142,788  3/1979  Matsumoto ........................... 354/199

Primary Examiner—L. T. Hix
Assistant Examiner—S. D. Schreyer
Attorney, Agent, or Firm—Sughrue, Mion, Zinn, Macpeak & Seas

[57] ABSTRACT

A focus position indicating device for a camera including an array of electrically activatable display elements such as light emitting diodes or liquid crystal elements, the number of which are activated being dependent upon the state of focusing. A drive contrast signal is converted into a digital signal and compared with the count output of a continuously-cycling digital counter. The output of the counter is also decoded into a set of signals one of which is activated for each possible state of the counter output. The decoder output signals are gated by the output of a comparator circuit with the outputs of the gates connected to drive the display elements.

6 Claims, 8 Drawing Figures

FOCUS INDICATING DEVICE FOR CAMERA

BACKGROUND OF THE INVENTION

The present invention relates to a device for a camera for displaying directly in the viewfinder of the camera an indication that the photographing lens is focused on the object in response to a contrast signal extracted from the image of an object to be photographed.

A variety of different focus detecting devices have been proposed in the art. These include a so-called "automatic focusing camera" in which the photographing lens is automatically positioned at a point where it is focused on the desired object, hereinafter referred to as "a focus position" when applicable. However, automatic focusing devices for a single-lens reflex camera are not currently in widespread commercial use. One of the important reasons for this is that, as a single-lens reflex camera is essentially a high grade camera, its focus detection accuracy must be extremely high. In addition, due to the reasons enumerated below, it is rather difficult to manufacture automatic focusing single-lens reflex cameras. That is, as most lenses used with a single-lens reflex camera are relatively heavy, the lens driving device must necessarily be large. In order to stop the photographing lens at the desired focus position, it is necessary to determine whether the lens is currently positioned in front of the focus position or behind it. The circuit required for performing these functions is necessarily intricate.

A focus detecting technique has been proposed which utilizes the fact that the optical power spectrum of the image of an object to be photographed becomes a maximum at the point of focus. For instance, in one implementation of such a technique, the image of an object is mechanically or electrically scanned with a photoelectric transducing element. More specifically, a time-series scanning output signal corresponding to the brightness distribution of the image is obtained by scanning the image. The signal thus obtained is differentiated thereby to extract high spatial frequency components which contain the desired contrast information. The differentiated signal is converted into an absolute value waveform. Then, the peak value of the absolute value waveform for each scanning period is detected and employed as a focusing signal.

Recently, a technique using a self-scanning type photoelectric transducing element as the scanning means has been disclosed in the art. The self-scanning type photoelectric transducing element is made up of a plurality of microphotoelectric transducing elements and a scanning circuit. Such an element is available on the market as a "MOS-FET type" device or a "CCD type" device depending on the type of scanning circuit employed. The use of such a photoelectric transducing element makes the scanning section compact so that it can be readily incorporated in a single-lens reflex camera or the like.

In order to stop the photographing lens at the focus position where the peak value becomes a maximum, it is necessary to provide some means for determining that the contrast signal is at a maximum. For this purpose, heretofore either two groups of photoelectric transducing elements were disposed respectively in front of and behind the focal plane on the optical axis or a memory circuit was used to compare signals representative of two different extension positions of the photographing lens.

The contrast signal can be produced without using differentiation. For instance, the contrast signal can be produced by a technique in which a number of microphotoelectric transducing elements are arranged in a plane in which the image of an object is formed and the difference of the photoelectric outputs of a pair of adjacent elements is determined.

SUMMARY OF THE INVENTION

An object of this invention is thus to provide a simple focus indicating device for a camera in which the contrast signal is derived from the image of an object to be photographed and the contrast signal is directly displayed in the finder without using an intricate lens driving mechanism as described above so as to be observable by the photographer's eye so that he can detect the focus position at which the above-described peak value becomes a maximum.

The focus indicating device according to the invention includes plural light emitting elements arranged in the viewfinder of a camera. The number of light emitting elements which are turned on becomes a maximum when the photographing lens is focused on an object to be photographed, namely, at the focus position. Thus, the device according to the invention is advantageous in that the focus position can be readily determined for objects different in contrast. Moreover, the device is simple in construction and compact in its arrangement.

In accordance with these and other objects of the invention, there is provided a focus position indicating device for determining and displaying the correct focus position from a contrast signal of an object to be photographed including an analog-to-digital converter for converting the contrast signal into a digital signal, a plurality of display elements which are connected so as to be turned on or off as desired, and a drive circuit for turning on the display elements in response to the digital signal wherein the number of display elements which are turned on is a maximum at the position of correct focus. The display elements may be light emitting elements such as light emitting diodes or may be display elements such as liquid crystal devices in which either the optical transmittance or reflectance is electrically changeable in accordance with an input signal.

DESCRIPTION OF THE PREFERRED EMBODIMENTS

This invention will be described in detail with reference to the accompanying drawings.

Figure 1:
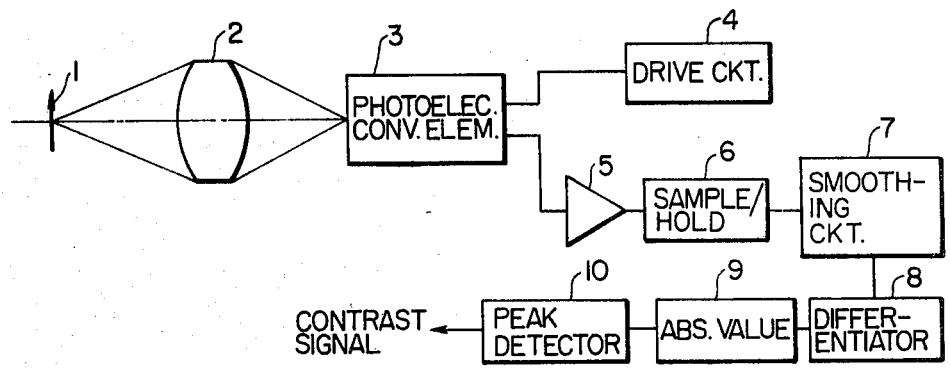
FIG. 1 is an explanatory diagram showing a device for extracting a contrast signal from the image of an object to be photographed.
Figure 2:
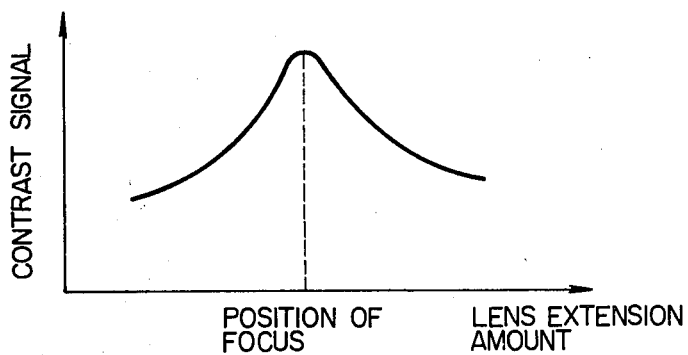
FIG. 2 is a graphical representation indicating a contrast signal which becomes a maximum when the photographing lens is focused on an object.

FIG. 1 shows an example of a device for extracting a contrast signal as may be employed with the invention. The image of an object 1 to be photographed is formed on a self-scanning type photoelectric transducing element 3 by a photographing lens 2. The self-scanning type photoelectric transducing element 3 is driven by a drive circuit 4, including a scanning pulse generating circuit, so as to produce a discrete time-series waveform which varies according to the brightness of the image. This waveform, after being amplified by an amplifier 5, is converted into an analog waveform by a sample-and-hold circuit 6. Undesirable high frequency components are removed from the analog waveform by a smoothing circuit 7 so that the resultant waveform corresponds closely to the original brightness distribution of the object's image. The output waveform of the smoothing circuit 7 is differentiated by a differentiation circuit 8 to provide a signal representative of the gradient of the brightness distribution of the image. The differentiated signal is converted into a predetermined one of a positive or negative voltage waveform by an absolute value circuit 9. The voltage waveform is applied to a peak value detecting circuit 10 where the peak value of the absolute value outputs over each scanning period is detected with the value so detected held until another peak value appears in the next scanning period. The sequence of peak value outputs thus obtained forms a contrast signal which has a maximum at the focus position as illustrated in FIG. 2.

Figure 3:
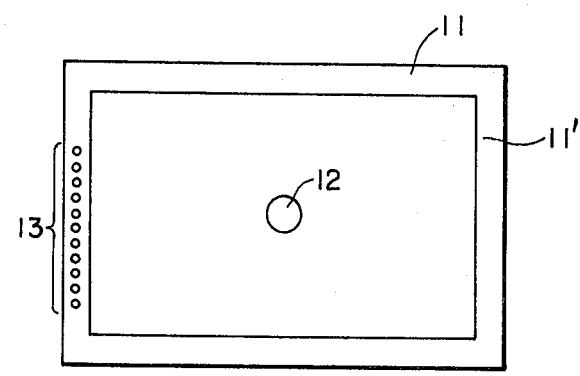
FIG. 3 is an explanatory diagram showing a viewfinder in which light emitting diodes of a focus indicating device according to this invention are arranged.
Figures 4A, 4B, 4C:
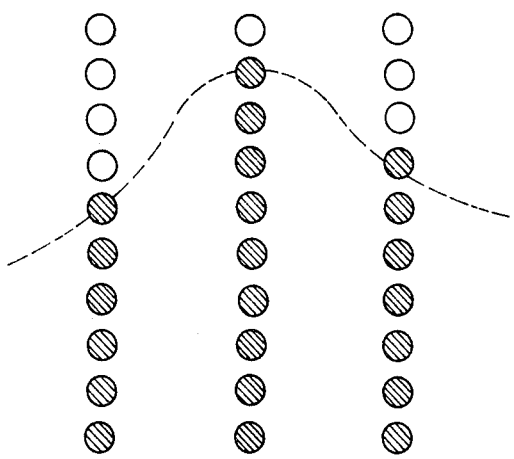
FIGS. 4A–4C are explanatory diagrams for a description of the display operation of the light emitting diodes shown in FIG. 3.

FIG. 3 shows a viewfinder in which light emitting diodes of a focus indicating device according to the invention are disposed. A field frame 11' and an array of light emitting diodes 13 are arranged in a finder frame 11. Variations of the contrast distribution of an object's image in a measuring field frame 12 are represented by variations in the number of light emitting diodes 13 which are turned on as illustrated diagrammatically in FIGS. 4A-4C. In each of FIGS. 4A-4C, a hatched circle designates a light emitting diode 13 which is turned on. The numbers of light emitting diodes 13 which are turned on correspond to the distribution, indicated by the dotted line, of contrast signals. FIGS. 4A and 4C show where the lens is not focused on the object, and FIG. 4B shows the case where the lens is correctly focused on the object. As the light emitting diodes are arranged in a linear array, the light emitting diodes which are turned on appear as a single bright bar or line. Therefore, the number of light emitting diodes which are turned on can be visually detected from the height or length of the bright bar or line.

Figure 5:
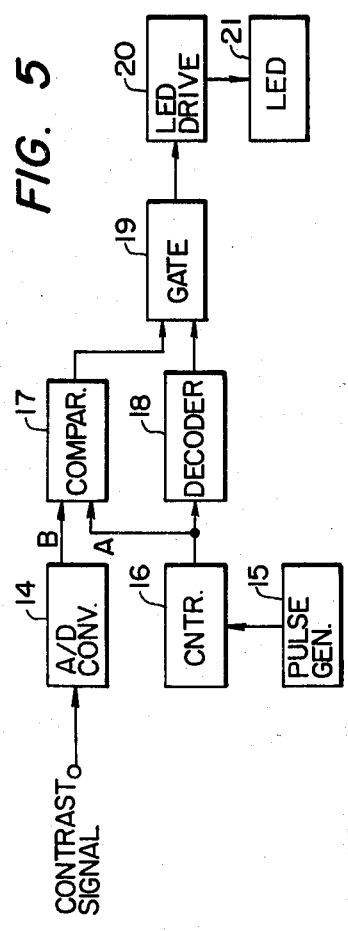
FIG. 5 is a block diagram of an electrical circuit of the focus indicating device according to the invention.

FIG. 5 is a block diagram of an electrical circuit for implementing the focus indicating device according to the invention. A contrast signal extracted by a contrast detecting device as shown in FIG. 1 is applied to an analog-to-digital converter circuit 14 where it is converted into an N-bit digital signal. The digital signal will be referred to as "a digital contrast signal" hereinafter. A train of pulses generated by a pulse generator 15 is applied to a digital counter 16 where it is converted into an N-bit digital count signal whose value changes sequentially as (0 0 0 0), (1 0 0 0), (0 1 0 0), ... (1 1 1 1) for instance. The digital contrast signal B and the digital count signal A are compared by a digital comparator 17. When $B \geq A$, the digital comparator 17 outputs a signal which opens a gate circuit 19. At the same time, the digital count signal is decoded by a decoder 18 in order to produce a pulse signal for turning on light emitting diodes 21. This pulse signal is applied to the other input terminal of the gate circuit 19. When $B \geq A$, the decoded signals are applied to a light emitting diode drive circuit 20 which controls the on-off operation of the light emitting diodes 21.

Figure 6:
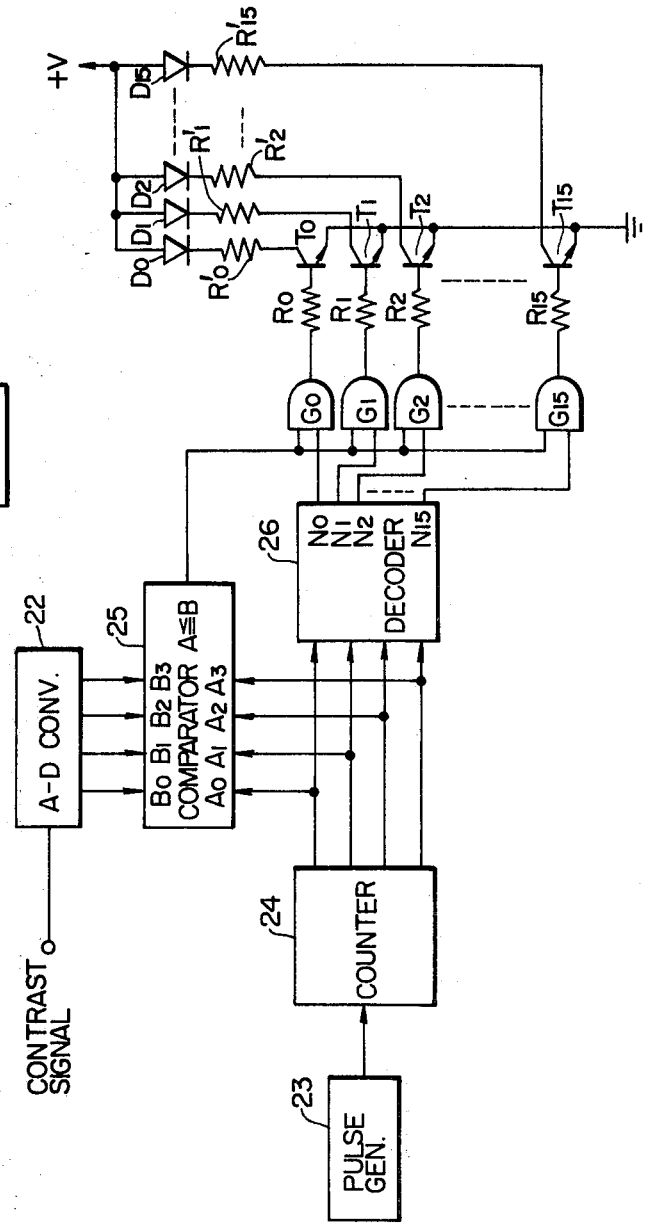
FIG. 6 is a schematic diagram of the electrical circuit shown in FIG. 5.

FIG. 6 shows a schematic diagram of an example of the electrical circuit shown in FIG. 5. In this example, sixteen light emitting diodes are controlled by 4-bit digital signals. The contrast signal is applied to an analog-to-digital converter 22. The contrast signal is there converted into one of sixteen different 4-bit $(B_0B_1B_2B_3)$ digital values according to the analog value thereof. A clock pulse signal provided by a pulse generator 23 is applied to a hexadecimal counter 24 as a result of which a 4-bit digital signal $(A_0A_1A_2A_3)$ is produced. The digital signal $(A_0A_1A_2A_3)$ is applied to a decoder 26 which in response thereto generates a corresponding one of sixteen decode pulse outputs $N_0$ through $N_{16}$. That is, only one is at a high logical level "1" while the remaining are at a low logical level "0". It should be noted that a different decode pulse is set to "1" upon receipt of a clock pulse signal.

The digital signals $(A_0A_1A_2A_3)$ and $(B_0B_1B_2B_3)$ are compared with a digital comparator 25. When the digital signal $(A_0A_1A_2A_3)$ is equal to or smaller than the digital signal $(B_0B_1B_2B_3)$, the digital comparator 25 produces a digital output of "1". While the output of the digital comparator 25 is maintained at "1", AND gates $G_0$ through $G_{15}$ are open rendering one of transistors $T_0$ through $T_{15}$ conductive as a result of which one of light emitting diodes $D_0$ through $D_{15}$ coupled respectively to the transistors $T_0$ through $T_{15}$ is turned on. Only those light emitting diodes are turned on in sequence which correspond to digital data points equal to or smaller than the digital data points from the output of the A-D converter. These light emitting diodes are momentarily turned on and off. However, if the pulse interval of the clock pulse signals is so selected that the on-off period of each light emitting diode is sufficiently short that the human eye cannot distinguish the on-off operations of the light emitting diodes, then the display appears as if the light emitting diodes are maintained in the on state. Thus, as many light emitting diodes as there are levels of the contrast signal can be turned on.

In the circuit shown in FIG. 6, a static system is employed to control the on-off operations of the light emitting diodes in which M control signals are used for controlling M light emitting diodes, that is, the number of levels of the control signal is equal to the number of light emitting diodes. However, the same effect can be obtained by utilizing a so-called dynamic system in which $(M_1+M_2)$ control signals, with $M_1$ and $M_2$ being so selected such that $M_1 \times M_2 = M$, are used to control M light emitting diodes. Moreover, the same effect can be obtained by using light emitting elements other than the light emitting diodes and the present invention can be practiced using display elements such as liquid crystals whose optical transmittance or reflectance is changeable.

As is apparent from the above description, according to the invention the number of light emitting elements which are turned on changes according to the contrast of the object being photographed. Therefore, a focus indicating device which is simple and compact with which the photographing lens can be readily focused on objects of different contrast is provided according to the invention. The use of light emitting diodes as the display elements can provide an automatic focus indication type camera which is light weight and high in reliability.

What is claimed is:

1. A focus position indicating device for a camera for determining a focus position from a contrast signal of an image of an object to be photographed comprising: an analog-to-digital converter for converting said contrast signal into a digital signal; a plurality of display elements arranged in a straight line and which are connected to be turned on and off; and a drive circuit for turning on said display elements in response to said digital signal such that said elements are turned on sequentially beginning at only one end of said straight line, and such that the number of said display elements which are turned on is a maximum at the focus position.

2. The focus position indicating device as claimed in claim 1 in which said display elements comprise light emitting elements.

3. The focus position indicating device as claimed in claim 1 in which said display elements comprise elements of which at least one of the optical transmittance and reflectance are electrically changeable.

4. A focus position indicating device for a camera for determining a focus position from a contrast signal of an image of an object to be photographed comprising: means for producing said contrast signal; an analog-to-digital converter having an input coupled to receive said contrast signal for converting said contrast signal into a digital signal; means for producing a stream of pulses; counter means for producing a sequential digital count in response to outputs from said pulse producing means; digital comparator means for comparing an output of said analog-to-digital converter with an output of said counter means; decoder means having an input coupled to receive said output of said counter for activating one of a plurality of output signals in response to corresponding ones of output signals from said counter means; a plurality of gate means, one of said gate means being provided for each output from said decoder means, one input of each of said gate means being coupled to receive an output signal from said decoder means and another input being coupled to receive a comparison output signal from said comparator means; a plurality of drive means, one of said drive means being coupled to an output of each of said gate means; and a plurality of display elements arranged in a straight line, each of said display elements being coupled to an output of a different one of said drive means such that said elements are turned on sequentially beginning at only one end of said straight line and such that the number of said display elements which are turned on is a maximum at the focus position.

5. The focus position indicating device as claimed in claim 4 in which said display elements comprise light emitting elements.

6. The focus position indicating device as claimed in claim 4 in which said display elements comprise elements of which at least one of the optical transmittance and reflectance is electrically changeable.

* * * * *